(12) United States Patent
Lin et al.

(10) Patent No.: US 11,095,189 B2
(45) Date of Patent: Aug. 17, 2021

(54) DRIVING MECHANISM

(71) Applicant: Delta Electronics, Inc., Taoyuan (TW)

(72) Inventors: Wu-Chen Lin, Taoyuan (TW);
Chi-Hsiang Kuo, Taoyuan (TW);
Chien-Chung Shih, Taoyuan (TW);
Chia-Hsiang Yang, Taoyuan (TW);
Yi-Yu Lee, Taoyuan (TW); Siao-Hao Guo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 62 days.

(21) Appl. No.: 16/415,965

(22) Filed: May 17, 2019

(65) Prior Publication Data
US 2020/0212759 A1    Jul. 2, 2020

(30) Foreign Application Priority Data

Dec. 28, 2018   (CN) .......................... 201811624523.8

(51) Int. Cl.
| | | |
|---|---|---|
| H02K 7/00 | (2006.01) |
| H02K 5/10 | (2006.01) |
| H02K 7/116 | (2006.01) |
| H02K 11/33 | (2016.01) |
| H02K 9/22 | (2006.01) |
| H02K 5/22 | (2006.01) |
| B62K 11/00 | (2006.01) |
| B62M 6/60 | (2010.01) |

(52) U.S. Cl.
CPC ............. *H02K 7/006* (2013.01); *B62K 11/00* (2013.01); *B62M 6/60* (2013.01); *H02K 5/10* (2013.01); *H02K 5/225* (2013.01); *H02K 7/116* (2013.01); *H02K 9/22* (2013.01); *H02K 11/33* (2016.01); *B62K 2204/00* (2013.01); *H02K 2211/03* (2013.01)

(58) Field of Classification Search
CPC .......... H02K 11/30; H02K 7/116; H02K 9/02; H02K 2213/06
USPC .................................. 310/64, 75 C, 75 R, 89
See application file for complete search history.

(56) References Cited

U.S. PATENT DOCUMENTS

| | | | | |
|---|---|---|---|---|
| 2004/0238253 | A1* | 12/2004 | Yonehana ............... | B60L 53/16 180/219 |
| 2011/0139531 | A1* | 6/2011 | Kanno .................. | B62K 11/10 180/220 |
| 2016/0254719 | A1* | 9/2016 | Pondelek ................ | H02K 5/08 310/54 |

FOREIGN PATENT DOCUMENTS

| | | | |
|---|---|---|---|
| CN | 101712355 B | | 6/2012 |
| CN | 103963907 A | | 8/2014 |
| CN | 205737954 U | * | 11/2016 |
| CN | 205737954 U | | 11/2016 |
| CN | 107651097 A | | 2/2018 |

(Continued)

*Primary Examiner* — Jose A Gonzalez Quinones
(74) *Attorney, Agent, or Firm* — Kirton McConkie; Evan R. Witt

(57) ABSTRACT

A driving mechanism is provided. The driving mechanism connects with a frame and a driving wheel by two ends thereof. The driving mechanism includes a motor housing, a motor assembly and a driving controller. The motor housing supports the frame and defines an inner space. The motor assembly is detachably assembled with the motor housing and located in the inner space. The motor assembly drives the driving wheel. The driving controller is detachably assembled with the motor housing, located in the inner space, and electrically connected with the motor assembly.

17 Claims, 5 Drawing Sheets

(56) References Cited

FOREIGN PATENT DOCUMENTS

| | | |
|---|---|---|
| CN | 108883802 A | 11/2018 |
| DE | 102012207775 A1 | 11/2013 |
| JP | 2013129338 A | 7/2013 |
| TW | 201238834 A | 10/2012 |
| TW | 201504109 A | 2/2015 |

* cited by examiner

DRIVING MECHANISM

FIELD OF THE INVENTION

The present disclosure relates to a driving mechanism, and more particularly to a driving mechanism for electric motorcycle.

BACKGROUND OF THE INVENTION

Generally, a swing arm is installed between the frame and the driving wheel in currently motorcycle structure. While applied in the electric motorcycle, the electric motor and the driving controller are installed on both sides of the swing arm respectively. The battery provides the power, and the driving controller is electrically connected to the motor for controlling the operation and the signal feedback. However, in order to install the motor and the driving controller on the swing arm, fixing interface and structure should be installed additionally. Accordingly, the assembly volume becomes larger, the difficulty of assembling becomes higher, and the cost of time becomes longer. In addition, due to the exposed wires between the motor and the driving controller (e.g., power cords and signal wires), the air tightness and the waterproofness are poor, and the risk of bending or damaging the wire is increased.

Therefore, there is a need of providing a driving mechanism in order to overcome the above drawbacks.

SUMMARY OF THE INVENTION

An object of the present disclosure provides a driving mechanism. The driving mechanism is assembled between the frame and the driving wheel for replacing the conventional swing arm as an assisted support structure. Compared with the conventional motorcycle with swing arm, the unsprung weight of the motorcycle with the driving mechanism is lighter, which improves the maneuverability and handling performance. Moreover, the motor assembly and the driving controller are both accommodated in the inner space of the motor housing. Consequently, the air tightness and waterproofness are improved, the length of the wires connected between the motor assembly and the driving controller is dramatically shortened, and the assembling time and unnecessary waterproof interface and connector are all saved. Furthermore, a plurality of wires connected between the motor assembly and the driving controller are all accommodated in the inner space of the motor housing. Accordingly, the wires are protected from being exposed, bent and damaged, thus the cost of wire maintenance is reduced, and the electrical reliability is improved.

In accordance with an aspect of the present disclosure, a driving mechanism is provided. The driving mechanism connects with a frame and a driving wheel by two ends thereof. The driving mechanism includes a motor housing, a motor assembly and a driving controller. The motor housing supports the frame and defines an inner space. The motor assembly is detachably assembled with the motor housing and located in the inner space. The motor assembly drives the driving wheel. The driving controller is detachably assembled with the motor housing, located in the inner space, and electrically connected with the motor assembly.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
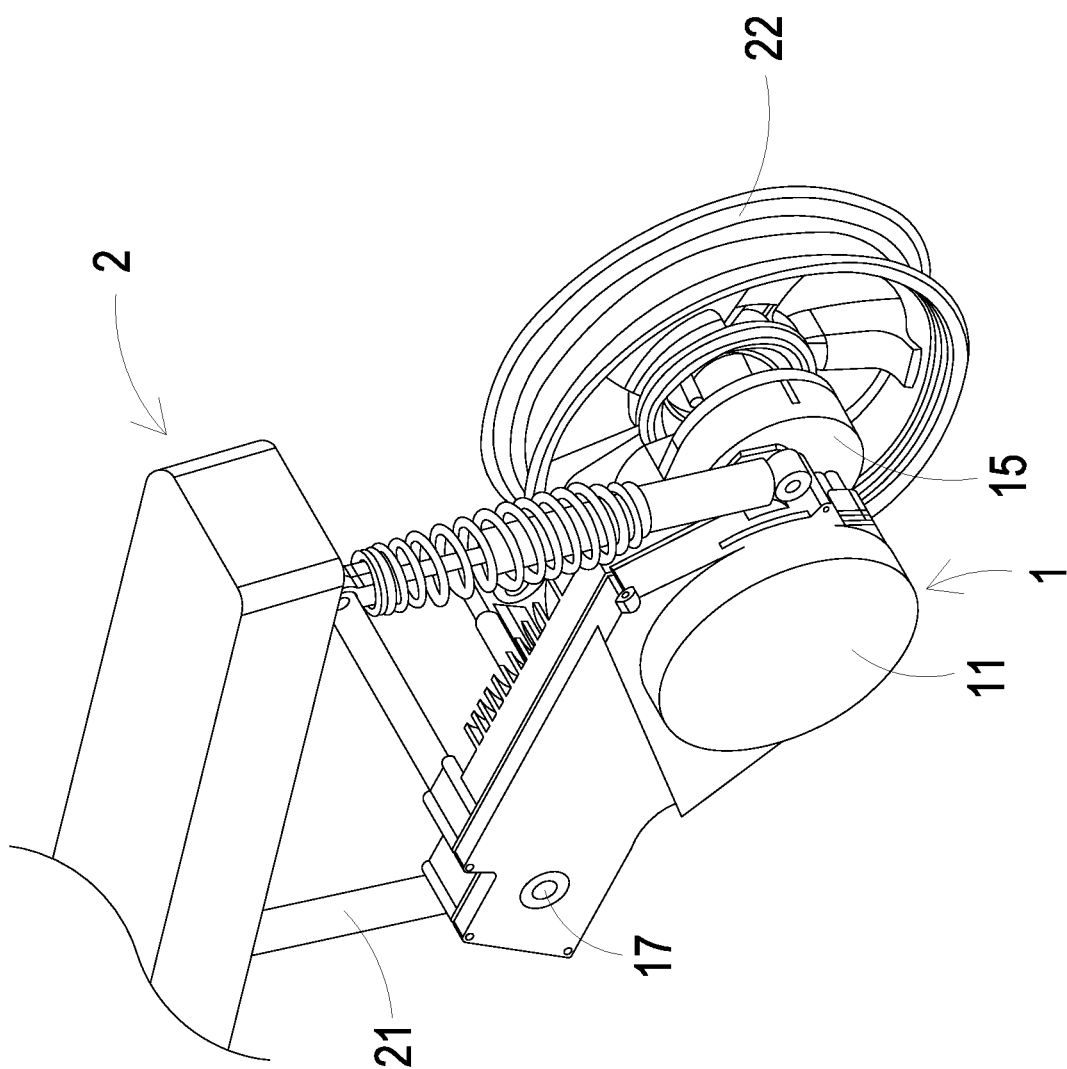
FIG. 1 is a partial schematic perspective view illustrating a driving mechanism of the present disclosure assembled with a motorcycle.
Figure 2A:
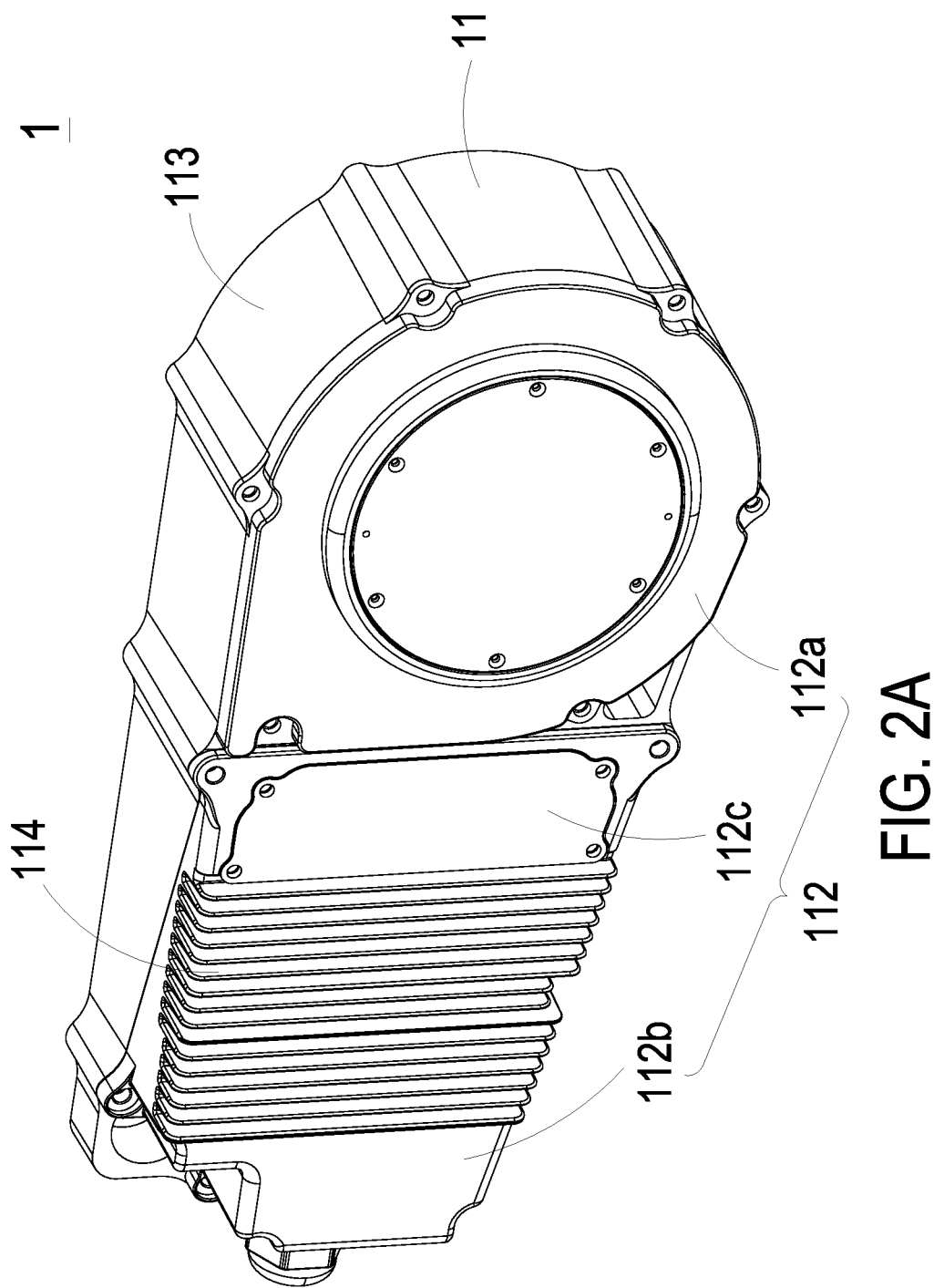
FIG. 2A is a schematic perspective view illustrating the driving mechanism according to an embodiment of the present disclosure.
Figure 2B:
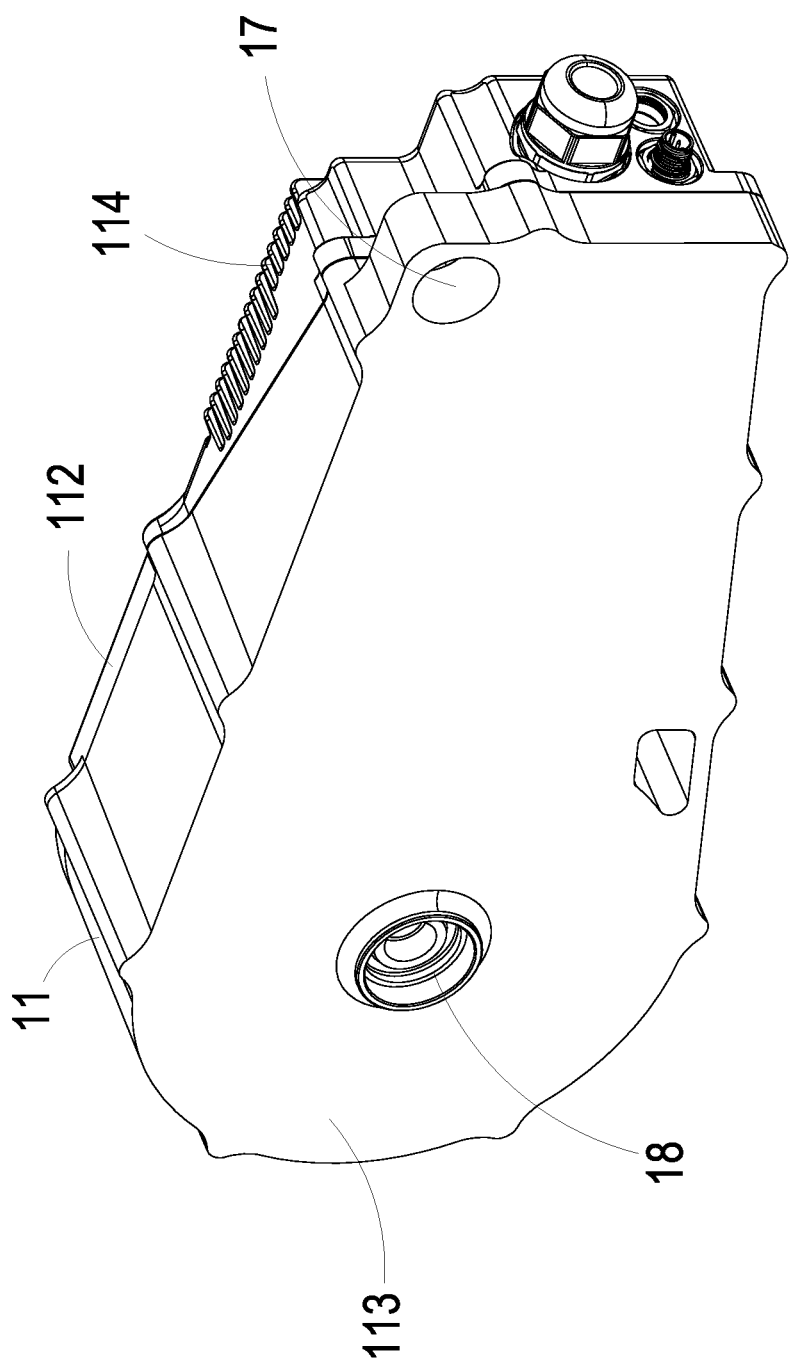
FIG. 2B is a schematic perspective view illustrating the driving mechanism of FIG. 2A at another viewing angle.
Figure 3A:
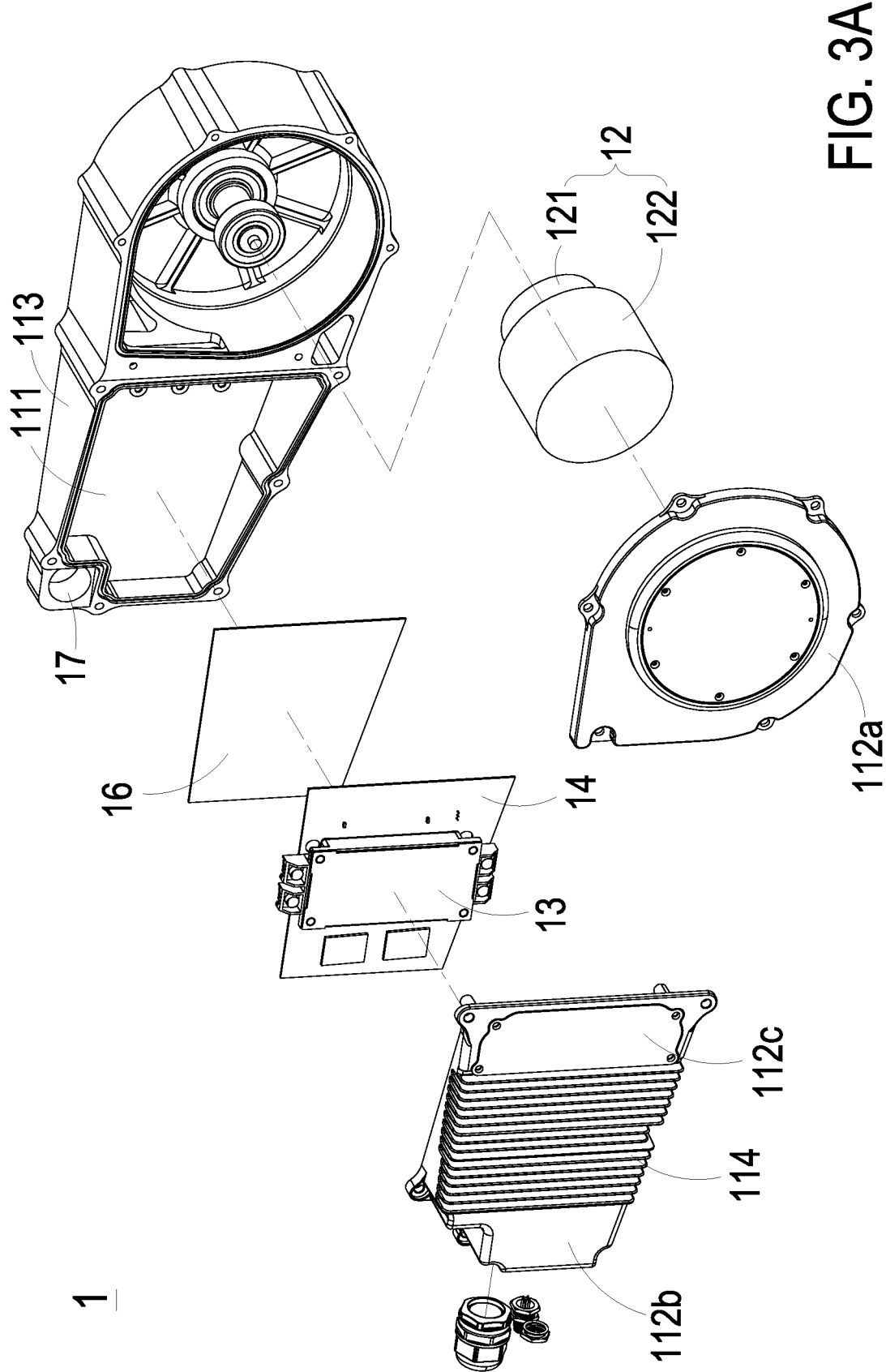
FIG. 3A is an exploded view showing the driving mechanism of FIG. 2A.
Figure 3B:
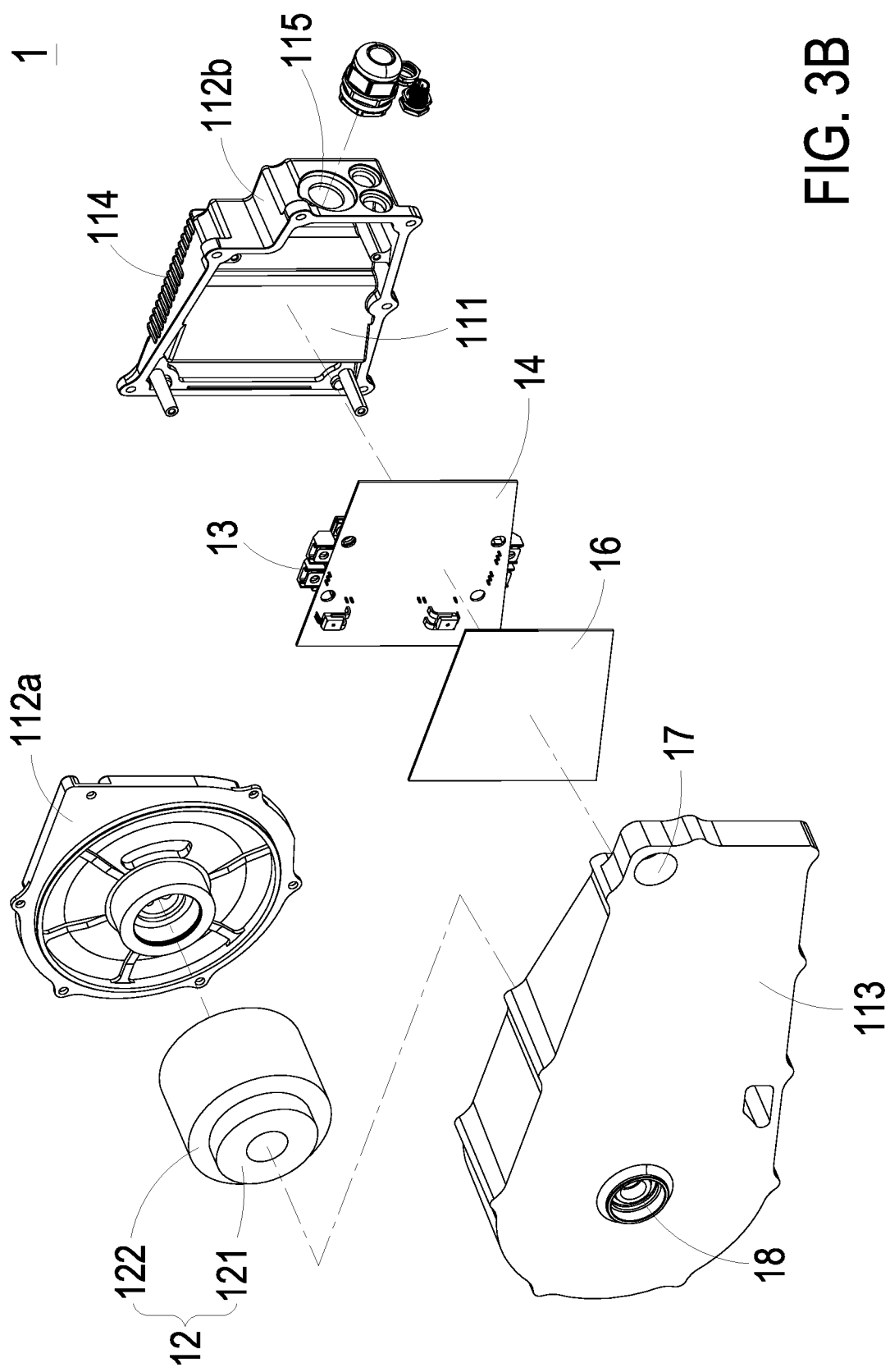
FIG. 3B is an exploded view showing the driving mechanism of FIG. 2A at another viewing angle.

FIG. 1 is a partial schematic perspective view illustrating a driving mechanism of the present disclosure assembled with a motorcycle. FIG. 2A and FIG. 2B are schematic perspective views illustrating the driving mechanism according to an embodiment of the present disclosure at different viewing angles. FIG. 3A and FIG. 3B are exploded views showing the driving mechanism of FIG. 2A at different viewing angles. Please refer to FIGS. 1, 2A, 2B, 3A and 3B. Two ends of a driving mechanism 1 of the present disclosure are assembled and connected with a frame 21 and a driving wheel 22 of a motorcycle 2 respectively. The driving mechanism 1 is configured to drive the motorcycle 2 and support the frame 21 as an assistant structure. As shown in FIG. 1, there still have common shock absorber (damper) and spring as the design of main support structures. However, the shock absorber and spring are not the main features of the present disclosure, and thus the detailed description thereof is omitted. The driving mechanism 1 of the present disclosure includes a motor housing 11, a motor assembly 12 and a driving controller 13. It should be noted that the driving mechanism 1 in this embodiment can also be adapted to drive a bicycle using an electric motor, but is not limited thereto.

The motor housing 11 defines and forms an inner space 111. Preferably but not exclusively, the motor housing 11 includes at least one top cover 112 and at least one bottom cover 113. The top cover 112 and the bottom cover 113 are detachably assembled with each other to define and form the inner space 111. Preferably but not exclusively, the bottom cover 113 is located between the top cover 112 and the frame 21, or is located between the top cover 112 and the driving wheel 22.

The motor assembly 12 is detachably assembled with the motor housing 11, located in the inner space 111, and configured for driving the driving wheel 22. Preferably but not exclusively, the motor assembly 12 includes a rotor 121 and a stator 122. The rotor 121 is combined with the stator 122 and is capable of rotating relative to the stator 122. In an embodiment, the motor assembly 12 is detachably assembled with the corresponding bottom cover 113.

The driving controller 13 is detachably assembled with the motor housing 11 and is located in the inner space 111. The driving controller 13 is electrically connected with the motor assembly 12 through a plurality of wires (not shown). Preferably but not exclusively, the motor assembly 12 and the driving controller 13 are electrically connected with each other through a terminal block or a patch board 14. As mentioned above, the plurality of wires (e.g., power cords and signal wires) connected with the motor assembly 12, the driving controller 13 and connected therebetween are all accommodated in the inner space 111. Consequently, the plurality of wires are protected from the invasion of water vapor, dust and dirt, and the electrical reliability is improved.

In an embodiment, the driving mechanism 1 further includes a reducer mechanism 15. The reducer mechanism 15 is assembled with the motor assembly 12 and the driving wheel 22, or the reducer mechanism 15 is integrated with the driving wheel 22 and then assembled with the motor assembly 12. Therefore, the motor assembly 12 can drive the driving wheel 22 of the motorcycle 2 through the reducer mechanism 15. The driving wheel 22 referred in the industry is the wheel capable of driving vehicles, and transmitting and outputting the power from a motor, and the driving wheel 22 is usually the back wheel, but not limited thereto.

Since the driving mechanism 1 is assembled and connected with the frame 21 and the driving wheel 22, the driving mechanism 1 can replace the swing arm of conventional motorcycle as an auxiliary support structure of the frame 21. Compared with the conventional motorcycle with swing arm, the motorcycle with the driving mechanism 1 of the present disclosure omits partial components. Thus, the unsprung weight of the motorcycle 2 drived by the driving mechanism 1 is relatively lighter, which improves the maneuverability and handling performance. In addition, the motor assembly 12, the driving controller 13 and the wires for connection are all accommodated in the inner space 111 of the motor housing 11, rather than the exposed structure as of traditional design. Accordingly, the air tightness and waterproofness are improved, the system is ensured to be stable, and the length of the wires connected between the motor assembly 12 and the driving controller 13 is dramatically shortened. Consequently, the assembling time, the unnecessary wires, and the cost for unnecessary waterproof interface and connector are all saved. To sum up, the plurality of wires connected with the motor assembly 12, the driving controller 13 and connected therebetween are all accommodated in the inner space 111. Therefore, the wires are protected from being exposed, bent and damaged, thus the wire maintenance cost is reduced, and the electrical reliability is improved.

In addition, actual ways of assembling the driving controller 13 to the motor housing 11 is not limited. In an embodiment, as shown in FIG. 3A, the driving controller 13 is detachably assembled with the top cover 112. In another embodiment, as shown in FIG. 3B, the driving controller 13 is detachably assembled with the bottom cover 113. Moreover, according to practical requirements, the motor assembly 12 may be integrated with the top cover 112 or the bottom cover 113 of the motor housing 11. Assembling interfaces and structures of the top cover 112 or the bottom cover 113 of the motor housing 11 are designed for requirements correspondingly to make the structures and contours thereof match up. Consequently, the utilization rate of space is improved, and the complexity of assembly is decreased. It is noted that design of the motor assembly 12 of the present disclosure is not limited thereto.

Further, the number of the top cover 112 and the bottom cover 113 of the motor housing 11 are without restriction, and it can be adjusted according to practical requirements. For example, as shown in FIG. 3A, the motor housing 11 includes one top cover 112 and one bottom cover 113, and the motor assembly 12 and the driving controller 13 share the bottom cover 113. In detail, the top cover 112 includes one first covering plate 112a and one second covering plate 112b. The first covering plate 112a of the top cover 112 is configured to cover the motor assembly 12, and the second covering plate 112b of the top cover 112 is configured to cover the driving controller 13, but not limited thereto. However, in some embodiments, the motor assembly 12 and the driving controller 13 may share or be collectively assembled to a same covering plate.

In another embodiment, the second covering plate 112b of the top cover 112 may further includes a movable covering plate 112c. The movable covering plate 112c is detachably disposed corresponding to the location(s) of the terminal block, the patch board 14 and/or at least a part of the driving controller 13. When the wires and/or the driving controller 13 need to be maintained or replaced, it is convenient since the operator only have to remove the movable covering plate 112c, rather than the second covering plate 112b of the top cover 112.

To be beneficial to heat dissipation for the driving mechanism 1, heat dissipating structures or components may be disposed. In an embodiment, the motor housing 11 includes at least one set of heat sink 114. Preferably but not exclusively, the heat sink 114 is integrated with the top cover 112 and/or the bottom cover 113 of the motor housing 11. In an embodiment, the driving mechanism 1 further includes a heat dissipating plate 16. Preferably but not exclusively, the heat dissipating plate 16 is located in the inner space 111 of the motor housing 11, i.e., inside of the motor housing 11, and is connected or attached to the driving controller 13 therein for providing the driving controller 13 with direct heat dissipation. In addition, the heat dissipating plate 16 and the driving controller 13 may be modularized to form a structures, and the modularized structures are detachably assembled with the top cover 112 or the bottom cover 113 of the motor housing 11 collectively.

In an embodiment, the driving mechanism 1 further includes a first fixing hole 17 and a second fixing hole 18. The first fixing hole 17 is configured for assembling the driving mechanism 1 with the frame 21 of the motorcycle 2. The second fixing hole 18 is configured for assembling the driving mechanism 1 with the driving wheel 22 of the motorcycle 2 and assembling the reduce mechanism 15 with the motor assembly 12. In an embodiment, the motor housing 11 further includes a wiring hole 115. The wiring hole 115 is in communication with the inner space 111 of the motor housing 11, and is configured for the wires to penetrate therethrough. For example, the wires connected between the driving controller 13 and the motor assembly 12 penetrates through the wiring hole 115, but not limited thereto.

From the above descriptions, the present disclosure provides a driving mechanism. The driving mechanism is assembled and connected with the frame and the driving wheel for replacing the conventional swing arm as an assisted support structure. Compared with the conventional motorcycle with swing arm, the unsprung weight of the motorcycle with the driving mechanism is lighter, which improves the maneuverability and handling performance. In addition, the motor assembly, the driving controller and the wires for connection are all accommodated in the inner space of the motor housing. Accordingly, the air tightness and waterproofness are improved, the system is ensured to be stable, and the length and amount of the wires connected between the motor assembly and the driving controller are dramatically reduced. Consequently, the assembling time and the cost for unnecessary waterproof interface and connector are all saved. Moreover, the plurality of wires connected with the motor assembly and the driving controller and connected therebetween are all accommodated in the inner space of the motor housing. Therefore, the wires are protected from being exposed, bent and damaged, thus the wire maintenance cost is reduced, and the electrical reliability is improved. Furthermore, the motor assembly and the driving controller may be integrated with the motor housing, thus the utilization rate of space is improved, and the complexity of assembly is decreased. Additionally, the heat sink is disposed on the motor housing, or the heat dissipating plate is disposed in the inner space. Therefore, the efficiency of heat dissipation is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driving mechanism connecting with a frame and a driving wheel by two ends thereof, the driving mechanism comprising:
    a motor housing supporting the frame and defining an inner space;
    a motor assembly detachably assembled with the motor housing and located in the inner space, wherein the motor assembly drives the driving wheel; and
    a driving controller detachably assembled with the motor housing, located in the inner space, and electrically connected with the motor assembly,
    wherein the motor housing comprises a to cover and a bottom cover, the to cover and the bottom cover are detachably assembled with each other to define the inner space, the bottom cover is located between the to cover and the driving wheel, the top cover comprises a first covering plate and a second covering plate, the motor assembly is corresponding to the first covering plate, the driving controller is corresponding to the second covering plate, the second covering plate of the top cover further comprises a movable covering plate, and the movable covering plate is detachably disposed corresponding to at least a part of the driving controller for facilitating the maintenance of the driving controller.

2. The driving mechanism according to claim 1, further comprising a reducer mechanism assembled between the motor assembly and the driving wheel.

3. The driving mechanism according to claim 2, wherein the reducer mechanism is integrated with the driving wheel and assembled with the motor assembly.

4. The driving mechanism according to claim 1, wherein the motor assembly is integrated with the top cover.

5. The driving mechanism according to claim 1, wherein the driving controller is detachably assembled with the top cover.

6. The driving mechanism according to claim 1, wherein the motor assembly is integrated with the bottom cover.

7. The driving mechanism according to claim 1, wherein the driving controller is detachably assembled with the bottom cover.

8. The driving mechanism according to claim 1, further comprising a het dissipating plate located in the inner space, and connected with the driving controller.

9. The driving mechanism according to claim 8, wherein the heat dissipating plate and the driving controller are detachably assembled with the top cover.

10. The driving mechanism according to claim 8, wherein the heat dissipating plat and the driving controller are detachably assembled with the bottom cover.

11. The driving mechanism according to claim 1, wherein the motor housing further comprises a heat sink.

12. The driving mechanism according to claim 11, wherein the heat sink is integrated with the top cover.

13. The driving mechanism according to claim 11, wherein the heat sink is integrated with the bottom cover.

14. The driving mechanism according to claim 1, wherein the motor assembly and the driving controller are electrically connected with each other through a plurality of wires, and the plurality of wires are all accommodated in the inner space.

15. The driving mechanism according to claim 1, wherein the motor assembly and the driving controller are electrically connected with each other through a terminal block or a patch board.

16. The driving mechanism according to claim 1, wherein the motor assembly comprises a rotor and a stator.

17. The driving mechanism according to claim 1, which is configured for driving a motorcycle or a bicycle.

* * * * *